(12) United States Patent
Souissi et al.

(10) Patent No.: US 8,971,896 B2
(45) Date of Patent: Mar. 3, 2015

(54) SYSTEMS AND METHODS FOR FACILITATING EFFICIENT VERTICAL HANDOFFS IN A WIRELESS COMMUNICATION SYSTEM

(71) Applicant: Novatel Wireless, Inc., San Diego, CA (US)

(72) Inventors: Slim Souissi, San Diego, CA (US); John Wu, San Diego, CA (US); Brad Kim, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 0 days.

(21) Appl. No.: 13/734,791

(22) Filed: Jan. 4, 2013

(65) Prior Publication Data

US 2013/0130697 A1    May 23, 2013

Related U.S. Application Data

(62) Division of application No. 13/082,279, filed on Apr. 7, 2011, now Pat. No. 8,489,093.

(51) Int. Cl.
H04W 36/00 (2009.01)
H04W 36/32 (2009.01)
H04W 36/14 (2009.01)
H04W 48/16 (2009.01)

(52) U.S. Cl.
CPC .............. *H04W 36/32* (2013.01); *H04W 36/14* (2013.01); *H04W 48/16* (2013.01)
USPC ........... 455/441; 455/434; 455/419; 455/436; 455/442; 455/422.1; 455/435.1; 455/432.1; 370/331

(58) Field of Classification Search
CPC ...... H04W 36/32; H04W 36/04; H04W 16/32
USPC .............. 455/441, 434, 419, 436, 442, 422.1, 455/435.1, 432.1; 370/331
See application file for complete search history.

(56) References Cited

U.S. PATENT DOCUMENTS

| 7,069,026 | B2 | 6/2006 | McClure |
| 7,421,268 | B2 * | 9/2008 | Lee et al. ...................... 455/411 |
| 8,489,093 | B2 | 7/2013 | Souissi et al. |

(Continued)

FOREIGN PATENT DOCUMENTS

| WO | 2004075423 A2 | 9/2004 |
| WO | 2012138932 A2 | 10/2012 |

OTHER PUBLICATIONS

International Search Report and Written Opinion in related International Patent Application No. PCT/US2012/032431 dated Nov. 30, 2012 (3 pages).

(Continued)

*Primary Examiner* — Nghi H Ly
(74) *Attorney, Agent, or Firm* — TechLaw LLP

(57) ABSTRACT

Systems and methods are provided for performing efficient vertical handoffs in a wireless user device are provided. The user device can comprise a mobile phone, computer table, handheld computer, or other computer system capable of connecting to more than one mobile wireless network that use different wireless communication protocols. Various efficient scanning methods are disclosed that are efficient in terms of battery usage, thermal performance, processing power, throughput performance, or a combination thereof.

5 Claims, 5 Drawing Sheets

(56) References Cited

U.S. PATENT DOCUMENTS

2007/0053410 A1 3/2007 Mahonen et al.
2009/0061862 A1 3/2009 Alberth, Jr. et al.
2014/0051435 A1* 2/2014 Murgan et al. ................ 455/434

OTHER PUBLICATIONS

International Search Report and Written Opinion in related International Patent Application No. PCT/US2012/032431 dated Nov. 30, 2012 (8 pages).

* cited by examiner

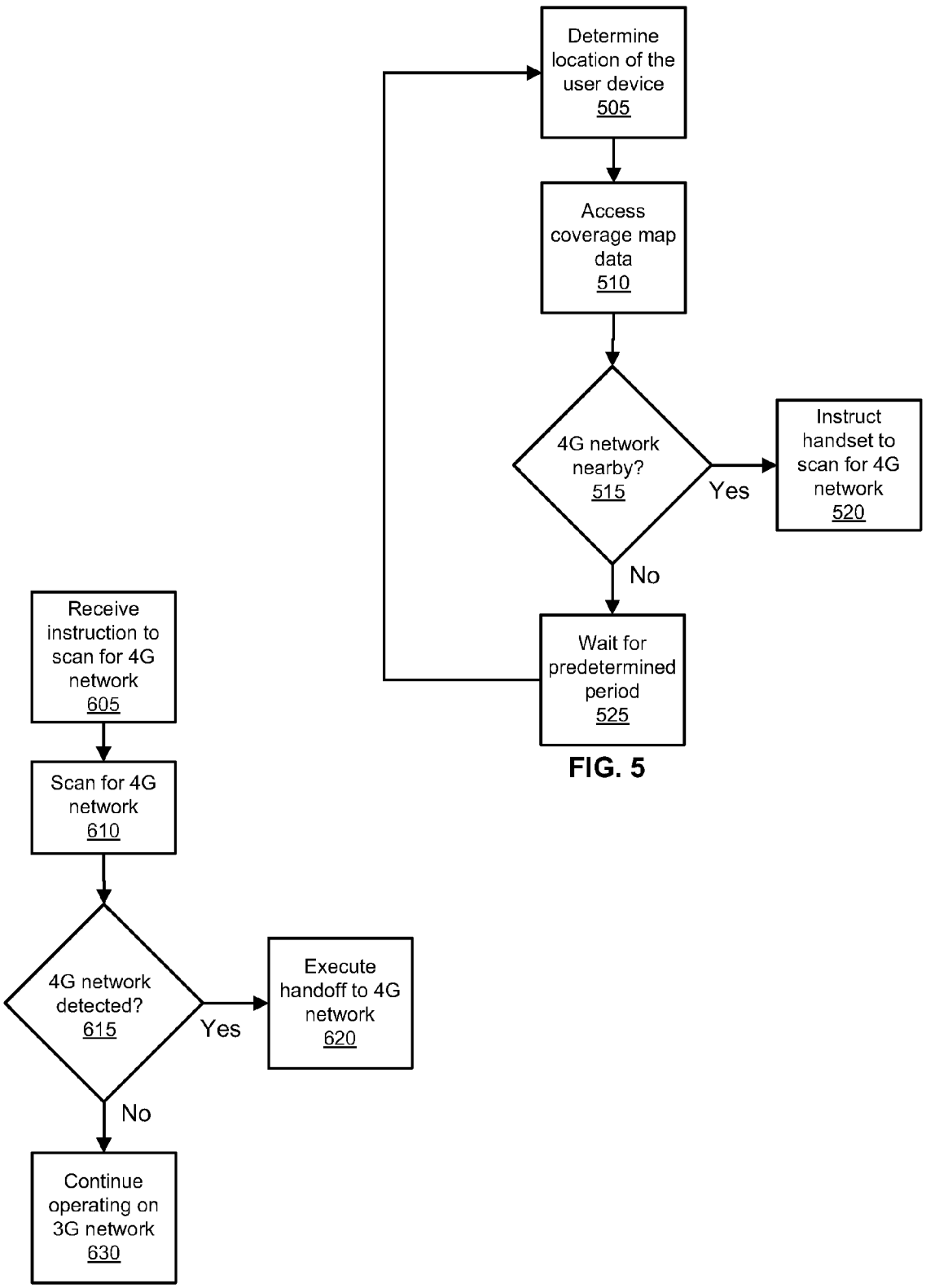

SYSTEMS AND METHODS FOR FACILITATING EFFICIENT VERTICAL HANDOFFS IN A WIRELESS COMMUNICATION SYSTEM

RELATED APPLICATIONS INFORMATION

This application claims priority as a Divisional under 35 U.S.C. 120 to U.S. patent application Ser. No. 13/082,279 filed on Apr. 7, 2011 and entitled "Systems and Methods for Facilitating Efficient Vertical Handoffs in a Wireless Communication System," which is incorporated herein by reference in its entirety as if set forth in full.

FIELD OF THE INVENTION

The present invention generally relates to the field of wireless communication systems and more specifically to systems and methods for performing vertical handoffs between wireless networks.

BACKGROUND

The 3rd Generation Mobile Telecommunications standards (3G) for providing wireless mobile voice and data communications is being slowly replaced by its successor 4th Generation Mobile Telecommunications (4G). Mobile carriers have begun to upgrade their 3G networks to provide 4G coverage, but the transition to 4G coverage will not occur overnight. Instead, mobile carriers have been upgrading portions of their networks to provide 4G service while the rest of the networks still operate using the 3G standards. As a result, subscribers may encounter parts of the network that provide 3G services while other portions of the network provide for 4G services. Furthermore, a subscriber who has established a 3G voice and/or data connection with the network may move from an area of the network where 3G services are provided to an area where 4G services are provided. Alternatively, a subscriber who has established a 4G voice and/or data connection with the network may move from an area of the network where 4G services are provided to an area where only 3G services are provided. The network and/or the subscriber's user device needs to be able recognize that this situation is about to occur and be able to complete a seamless vertical handoff from a first base station to a second base station.

Current methods for identifying whether 4G connectivity is available are based on an unconditional scanning algorithm that continuously searches for the 4G network with back off when there is no 4G detected. This method is generally not efficient since the scanning consumes additional power. Continuous scanning can seriously degrade battery life of a mobile device. Furthermore, the back off algorithm can cause the mobile device to not detect a 4G network in a mobile situation where the user moves the device from an area that has no 4G coverage into an area that has 4G coverage. As a result, the device can enter into an area where 4G coverage is available, but the device does not detect the 4G coverage and initiate a handoff.

SUMMARY

Systems and methods are provided for facilitating efficient vertical handoffs Systems and methods are provided for performing efficient vertical handoffs in a wireless user device are provided.

According to one aspect, a method for managing network connectivity of a wireless device is provided. The method includes the steps of scanning for a signal of a first wireless network while the wireless device is connected to a second wireless network, the first wireless network and the second wireless network being configured to operate using different wireless communication protocols; executing a vertical handoff from the second wireless network to the first wireless network if the signal of the first wireless network is detected; operating the wireless device in a scanning mode if the signal of the first wireless network is not detected, wherein operating the wireless device in the scanning mode further comprises: collecting information about the location of the wireless device, estimating mobility of the wireless device based on the location information, determining whether the wireless device is mobile, scanning for the signal of the first wireless network at a rate proportional to a rate of mobility associated with the wireless device if the wireless device is mobile, and scanning for the signal of the first wireless network at a reduced rate if the wireless device is not mobile.

According to still another aspect, method for managing network connectivity of a wireless device is provided where the wireless device is connected to a first wireless network and is configured to scan for a signal of a second wireless network. The first wireless network and the second wireless network are configured to operate using different wireless communication protocols. The method includes the steps of scanning for a signal of the second wireless network while the wireless device is connected to the first wireless network, collecting location information about the location of the wireless device; comparing the location information to coverage map information that indicates where coverage for a second wireless network is available; determining whether the wireless device is located in a coverage area of the second wireless network; scanning for a signal of a second wireless network if the wireless device is located in a coverage area of the second wireless network; executing a vertical handoff from the second wireless network to the first wireless network if the signal of the first wireless network is detected; and operating the wireless device on the first wireless network for a predetermined period of time before again scanning for the signal of the second wireless network.

According to still another aspect, a method for managing network connectivity of a wireless device from a remote server is provided where the wireless device is connected to a first wireless network and is configured to scan for a signal of a second wireless network. The first wireless network and the second wireless network are configured to operate using different wireless communication protocols. The server is configured to perform the steps of: determining the location of a the wireless device; accessing coverage map information that indicates where coverage for the second wireless network is available; comparing the location information to coverage map information that indicates where coverage for a second wireless network is available; and sending a network search command to the user device to scan for a signal of the second wireless network and to initiate a vertical handoff from the first network to the second network if the signal from the second wireless network is detected.

According to still another aspect, a method for managing network connectivity of a wireless device from a remote server is provided where the wireless device is connected to a first wireless network and is configured to scan for a signal of a second wireless network. The first wireless network and the second wireless network are configured to operate using different wireless communication protocols. The wireless device is configured to perform the steps of: receiving a network search command from a remote server instructing the wireless device to scan for a signal of the second wireless network and to initiate a vertical handoff from the first network to the second network if the signal from the second wireless network is detected; scanning for a signal of a second wireless network if the wireless device is located in a coverage area of the second wireless network; executing a vertical handoff from the second wireless network to the first wireless network if the signal of the first wireless network is detected; and operating the wireless device in a scanning mode if the signal of the first wireless network is not detected.

According to still another aspect, a wireless device configured to connect a first wireless network and a second wireless network is provided. The first wireless network and the second wireless network are configured to operate using different wireless communication protocols. The wireless device includes a mobile network interface, a non-transitory computer readable medium configured to store executable programmed modules, a processor communicatively coupled with the non-transitory computer readable medium configured to execute programmed modules stored therein, a mobile network interface module stored in the non-transitory computer readable medium, and a connection module stored in the non-transitory computer readable medium. The mobile network interface module is configured to manage data communications between the wireless router and the wireless access point user devices using the mobile network interface. The connection modules is configured to perform the steps of: scanning for a signal of the second wireless network while the wireless device is connected to the first wireless network, collecting location information about the location of the wireless device; comparing the location information to coverage map information that indicates where coverage for a second wireless network is available; determining whether the wireless device is located in a coverage area of the second wireless network; scanning for a signal of a second wireless network if the wireless device is located in a coverage area of the second wireless network; executing a vertical handoff from the second wireless network to the first wireless network if the signal of the first wireless network is detected; and operating the wireless device on the first wireless network for a predetermined period of time before again scanning for the signal of the second wireless network.

According to still another aspect, a wireless device configured to connect a first wireless network and a second wireless network is provided. The first wireless network and the second wireless network are configured to operate using different wireless communication protocols. The wireless device includes a mobile network interface, a non-transitory computer readable medium configured to store executable programmed modules, a processor communicatively coupled with the non-transitory computer readable medium configured to execute programmed modules stored therein, a mobile network interface module stored in the non-transitory computer readable medium, and a connection module stored in the non-transitory computer readable medium. The mobile network interface module is configured to manage data communications between the wireless router and the wireless access point user devices using the mobile network interface. The connection modules is configured to perform the steps of: scanning for a signal of a first wireless network while the wireless device is connected to a second wireless network, the first wireless network and the second wireless network being configured to operate using different wireless communication protocols; executing a vertical handoff from the second wireless network to the first wireless network if the signal of the first wireless network is detected; operating the wireless device in a scanning mode if the signal of the first wireless network is not detected, wherein operating the wireless device in the scanning mode further comprises: scanning for a signal of the second wireless network while a user device is connected to the first wireless network, collecting location information about the location of the wireless device; comparing the location information to coverage map information that indicates where coverage for a second wireless network is available; determining whether the wireless device is located in a coverage area of the second wireless network; scanning for a signal of a second wireless network if the wireless device is located in a coverage area of the second wireless network; executing a vertical handoff from the second wireless network to the first wireless network if the signal of the first wireless network is detected; and operating the wireless device on the first wireless network for a predetermined period of time before again scanning for the signal of the second wireless network.

Other features and advantages of the embodiments described herein should be apparent from the following description which illustrates, by way of example, aspects of the invention.

BRIEF DESCRIPTION OF THE DRAWINGS

The details of the present embodiments, both as to its structure and operation, may be gleaned in part by study of the accompanying drawings, in which like reference numerals refer to like parts, and in which:

FIG. 5 is a flow diagram of a subscriber-side method for scanning for network connectivity according to an embodiment; and FIG. 6 is a flow diagram of a subscriber-side method for scanning for network connectivity according to an embodiment.

DETAILED DESCRIPTION

Systems and methods are provided for performing efficient vertical handoffs in a wireless user device. According to an embodiment, the user device can comprise a mobile phone, computer table, handheld computer, or other computer system capable of connecting to more than one mobile wireless network that use different wireless communication protocols. For example, the user device can be configured to connect to either a 3G or a 4G network, and the user device can be configured to scan for a 4G connection while connected to a 3G network connection. Various efficient scanning methods are disclosed herein that are efficient in terms of battery usage, thermal performance, processing power, throughput performance, or a combination thereof.

According to an embodiment, the user device can be configured to operating as a WiFi hotspot for the one or more WiFi devices. In some embodiments, the user device can comprise a mobile wireless router.

According to some embodiments, subscriber-based scanning techniques are provided for vertical handoff from a 3G to 4G network. In an embodiment, the user device can be configured to search for a 4G signal when the user device is powered up. The user device can be configured to establish a connection with the 4G network if a 4G network is available. In an embodiment, if the user device does not detect a 4G network but a 3G network is available, the user device can be configured to connect to the 3G network and periodically scan for a 4G network based on various criteria, which are described in detail in the various embodiments set forth below. In some embodiments, the scanning techniques depend on the environment where the user device is located, and in some embodiments, the scanning can be triggered depending on whether the user device is in motion or remains in one location.

According to some embodiments, the user device can be configured to have a high scanning mode and a low scanning mode. In the high scanning mode, the user device scans more frequently for the 4G network than when the device is in the low scanning mode. In some embodiments, the user device can be configured to enter the high scanning mode when the user device is motion and configured to enter into the low scanning mode while the device is stationary or relatively stationary.

According to an embodiment, the techniques described herein can be used to perform a vertical handoffs between WiMax ("Worldwide Interoperability for Microwave Access" which is part of the IEEE 802.16 series of wireless broadband standards) and 1xEVDO Rev. A (DORA) within a multimode wireless user device. In some areas, WiMax 4G networks have been deployed as an overlay on top of existing 1xEVDO Rev. A 3G networks. The design of these two types of networks did not include an efficient handoff scheme similar to what has been deployed for GPRS/UMTS networks or 1xEVDO Rev. A/LTE technologies ("3GPP Long Term Evolution" wireless communications standard).

Figure 1:
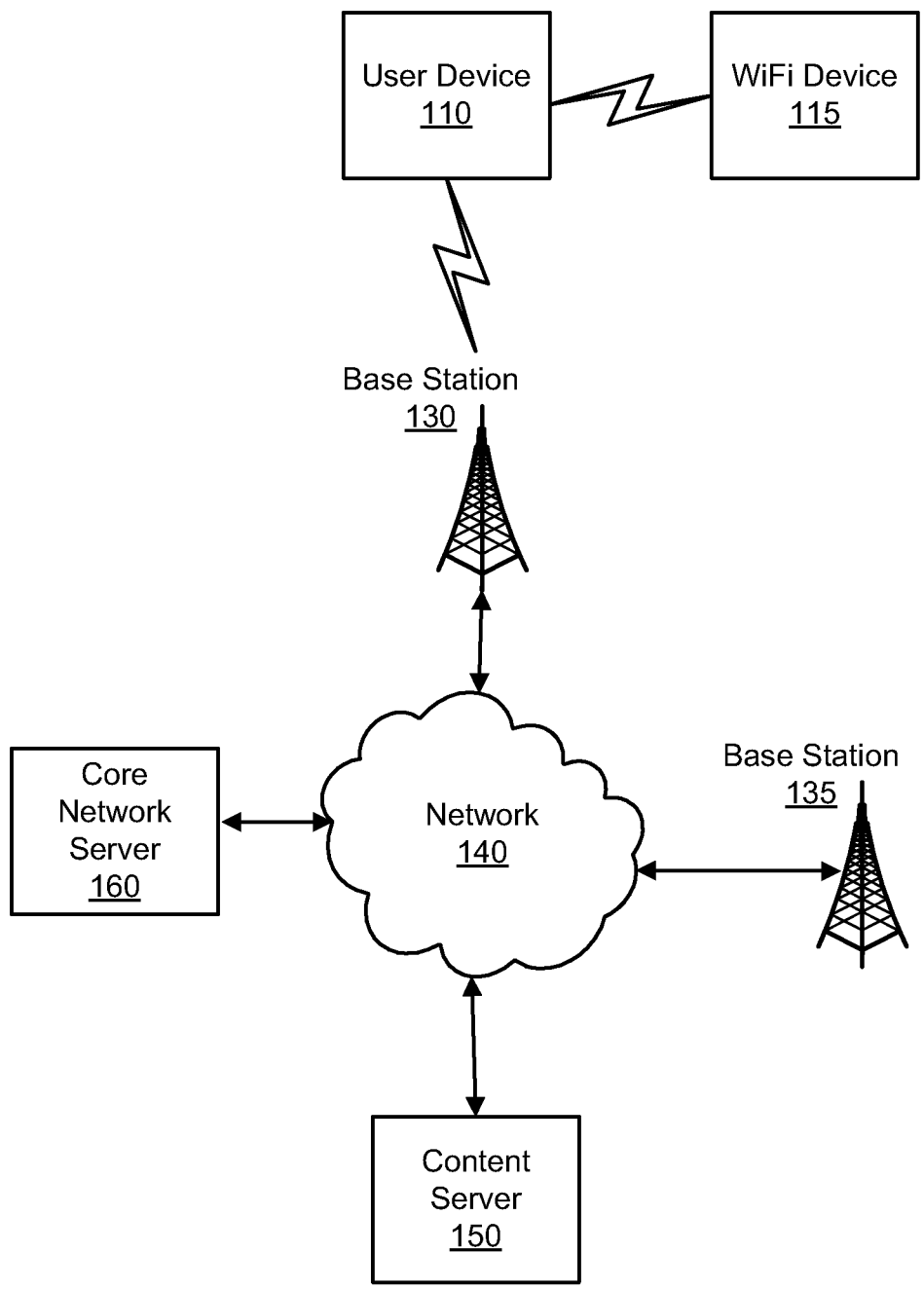
FIG. 1 is a block diagram of a wireless communication network in which the systems and methods disclosed herein can be implemented according to an embodiment.

FIG. 1 is a block diagram of a wireless communication network in which the systems and methods disclosed herein can be implemented according to an embodiment.

User device 110 can be a mobile device includes a WLAN interface that allows one or more Wifi devices 115 to connect to the user device 110. According to some embodiments, the user device 110 can comprise a mobile phone, computer tablet, handheld computer, or other computer system that is capable of operating as a WiFi hotspot for the one or more WiFi devices 115. In other embodiments, the mobile device can comprise a mobile router, such as a MiFi™ portable wireless router by Novatel Wireless. The user device 110 also includes a WWAN interface that allows the user device 110 to connect to base stations 130 or 135 or another wireless access point of a WWAN.

The user device 110 can include one or more WWAN interfaces that allow the user device 110 to connect to one or more WWAN networks. For example, the user device 110 can include a WWAN interface that allows the user device 110 to establish connection to a 3G or 4G network. In some embodiments, the user device 110 can include a WWAN interface that can be configured to connect to WWAN connections provided by different WWAN network providers. For example, various mobile phone/data network provider may operate using different frequencies and/or communications standards, and the user device 110 can include multiple WLAN interfaces or a configurable WLAN interface that enables the user device 110 to connect to the networks of mobile phone/data network provider using different frequencies and/or communications standards. For example, the WWAN interface can be configured to implement one of the Third Generation (3G) wireless communication protocols, such as EDGE, CDMA2000, or the Universal Mobile Telecommunications System (UMTS) protocols, High Speed Packet Access (HSPA) or HSPA+ protocols, Long Term Evolution (LTE) protocols, Evolution Data Optimization (EV-DO) rev. A (DORA), WiMAX, and/or other newer 4G protocols.

WiFi device 115 can be any sort of processor-enabled computing device capable of communicating wirelessly with user device 110. WiFi device 115 can comprise, for example, a personal computer, a laptop computer, a tablet computer, a handheld computer, personal digital assistant ("PDA"), telephone, workstation, or the like. The WiFi device 115 includes a WLAN interface that allows the WiFi device 115 to communicate with wireless user device 110.

Base stations 130 and 135 serves as a wireless access point for a WWAN that allows the user device 110 and other devices that are equipped with WWAN interfaces to connect to the network 140. The base stations 130 and 135 provide access to network 140 to a plurality of user devices. According to an embodiment, base station 130 may provide a coverage area that overlaps at least in part, the coverage area of base station 135. Furthermore, the base station 130 may be configured to provide 3G coverage while base station 135 is configured to provide 4G coverage, or vice versa. If the user device 110 moves from the coverage area of one of the base stations to the coverage area of the other base station, a handoff can be performed. In embodiments where one base station provides 3G coverage and the other base station provide 4G coverage, a vertical handoff between the base stations can be performed that allows the user device 110 to move from a 3G to 4G connection. A vertical handoff can be triggered by user device 110 in some embodiments or by the network server 160 in other embodiments. Some embodiment also provide for vertical handoffs from the 4G connection to a 3G connection as the user device 110 leaves a coverage area for 4G services for one where only 3G services are available.

Core network server 160 provides various network provider related services to subscribers of a mobile network. In some embodiments, the core network server can provide authentication of user devices 110 to determine whether the user devices are authorized to use the network services provided by the network provider (e.g., is the user device associated with a subscriber or authorized to roam on the network provider's network if not a subscriber). Core network server 160 can also be configured to track the position of user device 110 relative to one or more base stations, such as base stations 130 and 135. The core network server 160 can compare the location of the user device 110 to network coverage map information that indicates where 3G and 4G coverage is available and send commands to the user device 110 to scan for 4G coverage if the device is located in or moving toward a coverage area where 4G service is provided.

Content server 150 provides content such as web pages, applications, and/or other network accessible content over the Internet. The WiFi devices 115 and/or user device 110 can request content from one or more content servers 150. The user device 110 routes requests received from the user device via the WLAN interface to base station 130, which in turn routes the requests for content to the content server 150 via network 140. Network 140 can comprise one or more networks and can be the Internet. Base stations 130 and 135 can be connected to the Internet via one or more intermediate networks.

Figure 2:
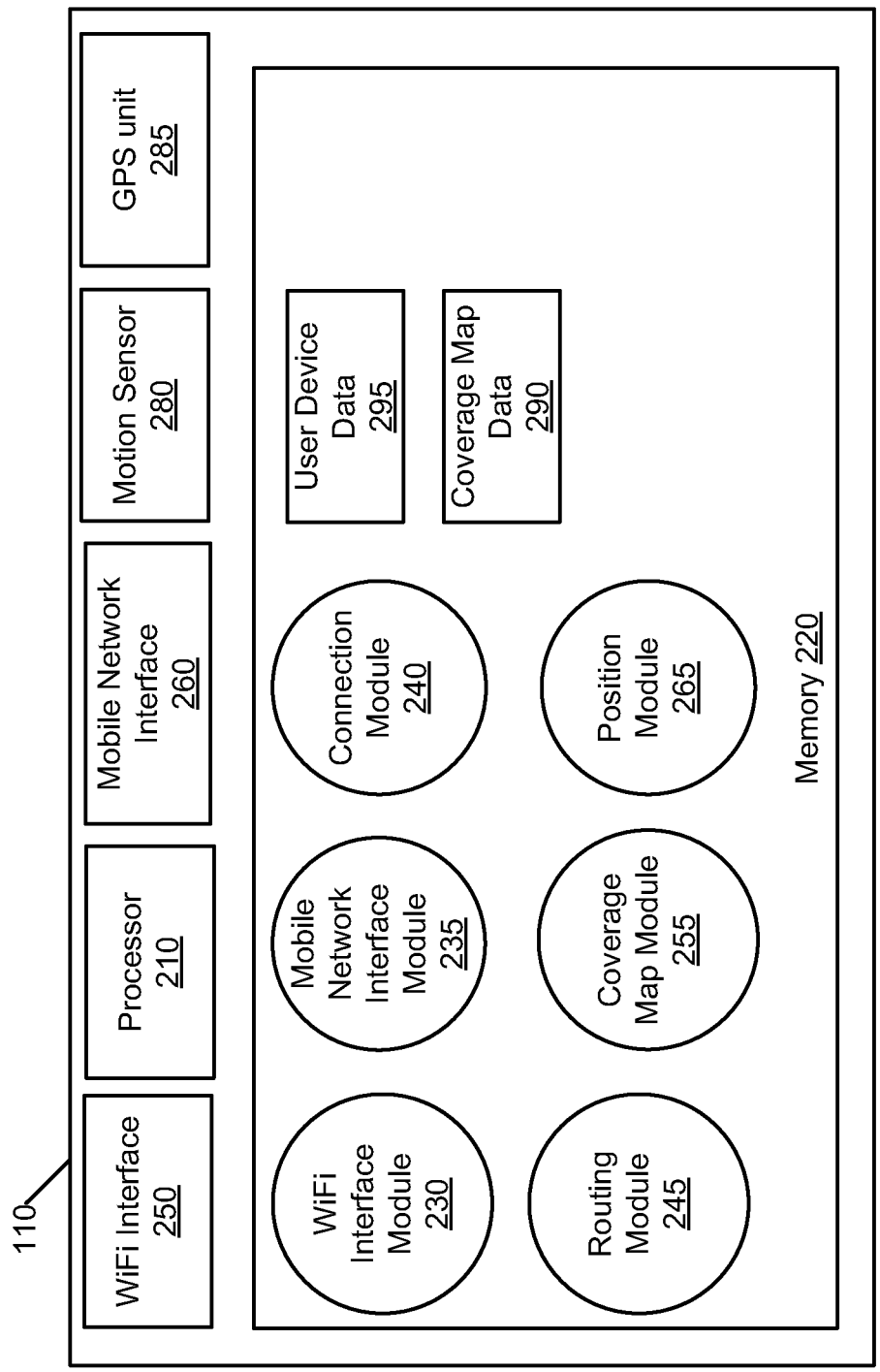
FIG. 2 is block diagram of a wireless router in which the systems and methods disclosed herein can be implemented according to an embodiment.

FIG. 2 is block diagram of a user device in which the systems and methods disclosed herein can be implemented according to an embodiment. The user device 110 illustrated in FIG. 2 can be used to implement user device 110 illustrated in FIG. 1. In some embodiments, the user device 110 can be a mobile device, such as a mobile phone, tablet computer, portable computer, portable device. In other embodiments, the user device 110 can comprise a mobile router that can be used to provide mobile network access for WiFi devices that are configured to connect to a WLAN but are not configured to connect to a WWAN.

User device 110 includes a processor 210, a memory 220, a WiFi interface 250, and a mobile network interface 260. The wireless router also includes a WiFi interface module 230, a mobile network interface module 235, a routing module 245, a coverage map module 255, a position module 265, and a connection module 240 stored in memory 220. User device data 295 and coverage map data 290 can also be stored in memory 220. The mobile device 110 also includes a motion sensor 280 and a GPS unit 285.

According to an embodiment, memory 220 comprises a non-transitory, tangible computer readable memory. Memory 220 can comprise persistent read-only memory (ROM), persistent read-write memory, such as flash memory, non-persistent memory, such as random access memory (RAM), or a combination thereof. Memory 220 can include various modules that can be used to send and/or receive data using the WiFi interface 250 and the mobile network interface 260. Memory 220 can also be used to store data used by one or more of the modules, such as user device data 245.

WiFi network interface module 230 is configured to manage data communications over the wireless network via WiFi interface 250. The WiFi interface 230 comprises at least one transmitter for transmitting data to the one or more user device 110 via a WLAN connection with the one or more user device 110. The WiFi interface 230 also includes at least one receiver for receiving data from the one or more WiFi devices 115. WiFi network interface module 230 is configured to manage transmitting and receiving of data over the WiFi interface 250. According to an embodiment, WiFi interface 250 can include one or more antennas for transmitting and/or receiving data via a WLAN connection with one or more WiFi devices 115.

Mobile network interface module 235 is configured to manage data communications between the user device 110 and the base station 130 via the mobile network interface 260. The mobile network interface 260 comprises at least one transmitter for transmitting data to base station 130, base station 135, or other wireless access points via a WWAN connection with the base station 130, base station 135, or other wireless access points provided by the WWAN network provider. The mobile network interface 260 also includes at least one receiver for receiving data from base station 130, base station 135, or other wireless access points provided by the WWAN network provider. Mobile network interface module 235 is configured to manage transmitting and receiving of data over the mobile network interface 260. According to an embodiment, mobile network interface 260 can include one or more antennas for transmitting and/or receiving data via a WWAN connection to the base station 130, base station 135, or another wireless access point provided the by the WWAN network provider. According to an embodiment, mobile network interface module 235 can be configured to allow the user device 110 to establish connection to a 3G or 4G network.

Routing module 245 can be configured route data received from the WiFi device 115 via the WiFi interface 230 to remote devices, such as the content server 150, via mobile network interface 260. Routing module 245 can also configured to route data received via the mobile network interface 260 to the WiFi devices 115. According to an embodiment, the routing module 245 can assign a network address, such as an IP address, to each WiFi device 115 that is connected to user device 110. According to an embodiment, the routing module 245 can store information about which WiFi device 115 are connected to user device 110 in user device data store 295 in memory 220. This information can include network addresses associated with the WiFi device 115, and/or other information about the device, such as what type or class of device a user device 110 is, and a Quality of Service (QoS) level associated with the user device.

Motion sensor 280 can be configured to detect motion of the user device 110. Data from motion sensor 280 can be provided to the position module 265. According to an embodiment, motion sensor 280 can comprise an accelerometer, a gyroscopic sensor, or other type of sensor that can be used to detect that the user device 110 is being moved. Information regarding the motion of the user device 110 can be used to predict whether the user device 110 is going to move from the coverage area of one base station to another and/or whether the user device 110 is going to enter and/or leave a 3G or 4G coverage area.

Global Positioning System (GPS) unit 285 can be configured to provide location and/or time information to the position module 265.provide location and/or time information to the position module 265. GPS unit 285 can be used to obtain location and/or time data from a global navigation satellite system. The location information obtained from GPS unit 285 can be used by the position module 265 to determine the location of the user device 110.

Position module 265 can be configured to receive motion sensor data from motion sensor 280 and location and/or time information from GPS unit 280. According to an embodiment, position module 265 can use the data from the motion sensor 280 and/or the GPS unit 280 to determine whether the user device 110 is moving. The position module 265 can be configured to provide information including the current location of the user device 110, whether the user device 110 is moving, how fast the user device 110 is moving, and in what direction the user device 110 is moving to the connection module 240. The position module 265 can also be configured to provide information including the current location of the user device 110, whether the user device 110 is moving, how fast the user device 110 is moving, and in what direction the user device 110 is moving to the coverage map module 255. According to an embodiment, the position module 240 can determine the location of the user device 110 by through multilateration based on the signal strength to nearby base stations.

Coverage map module 255 can be configured to provide network coverage information based on the location of the user device 110. The network coverage information can include the location of nearby base stations and identifying information associated with those base stations. The network coverage information can also include geographic information that indicates which geographic areas have 3G coverage and/or 4G coverage. In an embodiment, the connection module 240 can request location and/or motion information for the user device 110 from the position module 265. In an embodiment, the coverage map module 255 can use the information received from the position module 265 to determine whether the user device is in a 3G coverage area, 4G coverage area, or an area that includes both 3G and 4G coverage. In an embodiment, the coverage map module can also be configured to determine whether the user device 110 is moving toward an area has 3G coverage, 4G coverage, both 3G coverage and 4G coverage, or no coverage. In some embodiments, coverage map module 255 can use coverage map data 290 to determine the current location of the user device based on nearby base stations detected by the user device 110. In some embodiments, the coverage map data 290 can be preinstalled on the user device 110. In other embodiments, coverage map data can be downloaded by coverage map module 255 based on the current location of the user device and the coverage map module 255 can update the coverage map data 290 to include the downloaded data. In other embodiments, the coverage map data 290 can be periodically pushed to the user device 110 by the core network server 160.

Connection module 240 can be configured to periodically scan for 4G coverage if the user device 110 is currently operating on a 3G connection. The connection module 240 can be configured to handle handoffs between 3G and 4G networks. In an embodiment, the connection module can be configured to scan for 4G coverage based on the location of the user device 110 and/or the direction and/or speed a which the user device is moving. In an embodiment, the connection module 240 can be configured request position/motion from the position module 265 and to increase the frequency of scanning for 4G network connectivity if the device motion or if the device motion exceeds a predetermined threshold. In an embodiment, the connection module 240 can be configured to stop scanning for a 4G connection or to reduce the frequency of scanning for a 4G connection below a predetermined threshold frequency if the motion of the user device 110 falls below a predetermined speed or the user device 110 is stationary. In an embodiment, the connection module 240 can be configured to request network map information from coverage map 265 and to scan for 4G network connectivity if the user device 110 is an area where 4G coverage is available but the device is currently operating using a 3G connection. In an embodiment, the core network server 160 can be configured to track the location of the user device 110 and to determine whether the user device 110 is entering a 4G coverage area. If the user device 110 is currently operating with a 3G connection, the core network server 160 can send a command to the user device 110 to scan for a 4G network. The connection module 240 can then scan for the 4G network and perform a handoff if 4G connectivity is available.

Subscriber-Based Handoff

According to some embodiments, scanning for 4G connectivity and making the determination whether to perform a handoff can be performed by the user device 110. Methods are described here whereby the user device 110 can perform a vertical handoff from a 3G network to a 4G network. When a dual-mode device, such as user device 110, is powered up, the user device 110 can be configured to search for a 4G signal. According to an embodiment, the connection module 240 can be configured to perform this search. If a 4G signal is available, the user device 110 can be configured to connect the 4G network. Otherwise, in the absence of a 4G signal, if a 3G signal is available, the user device 110 can be configured to connect to a 3G network and to initiate a scanning process for the 4G network while operating using a 3G network connection.

Conventional implementations for dual-mode 3G and 4G devices continually scan for a 4G signal while connected to a 3G network. This approach can have a significant impact on the performance of these conventional devices, because continually scanning is not efficient in terms of battery usage, thermal performance, processing power, and in some instances, throughput performance.

The various methods disclosed herein employ scanning algorithms that control the frequency at which a user device 110 scans for 4G connectivity while connected to a 3G network. These methods can significantly decrease the battery usage for the user device 110. These methods can also increase thermal performance, processing power, increase throughput performance for the device, or a combination thereof, by selectively scanning for a 4G signal based on various information, such as the location of the user device 110, whether the device is stationary, and how fast and/or in what direction that user device 110 is moving. In some embodiments, the user device 110 can use coverage map information in conjunction with the location and/or the movement of the user device to determine whether to scan for a 4G network.

Figure 3:
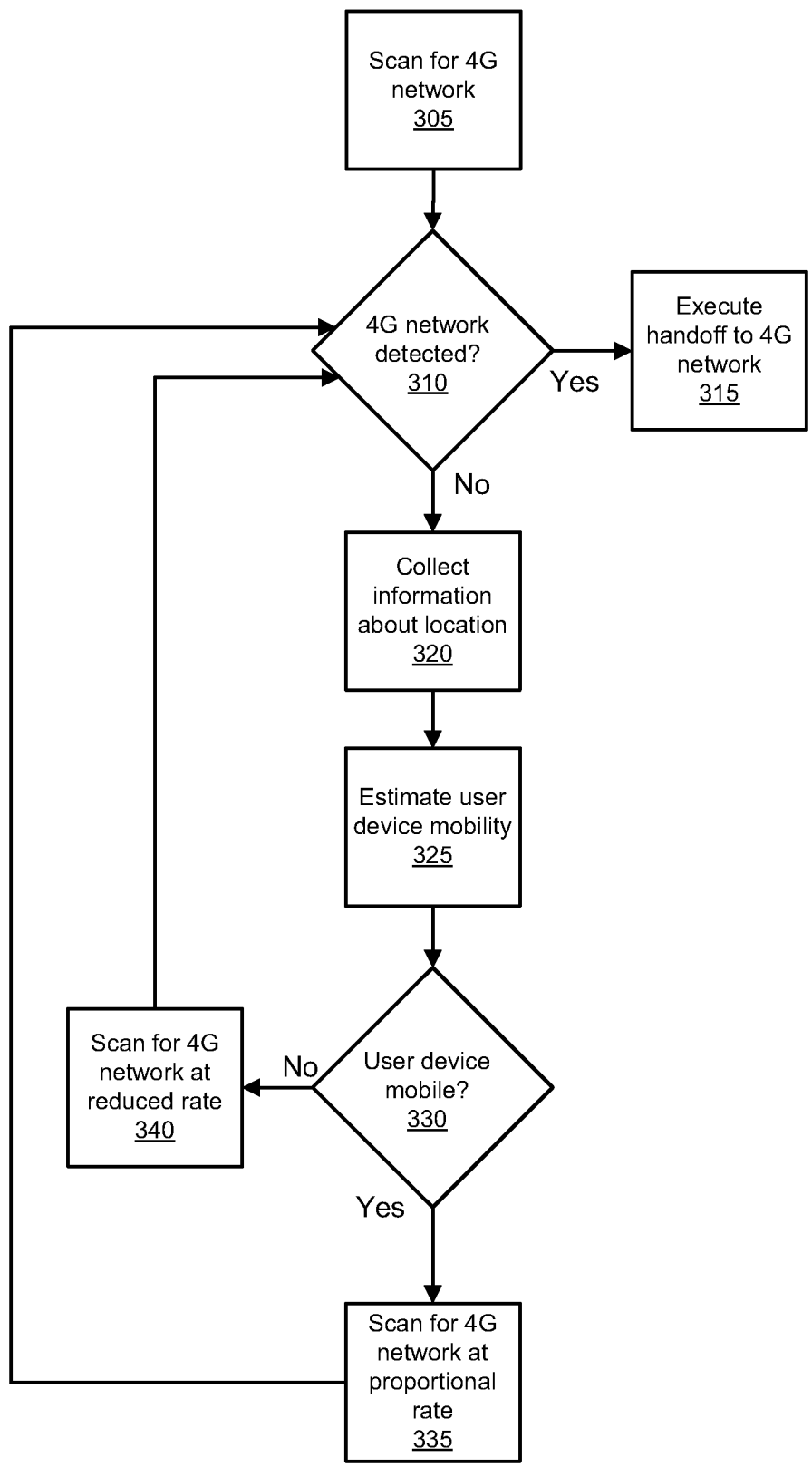
FIG. 3 is a flow diagram of a subscriber-side method for scanning for network connectivity according to an embodiment.
Figure 4:
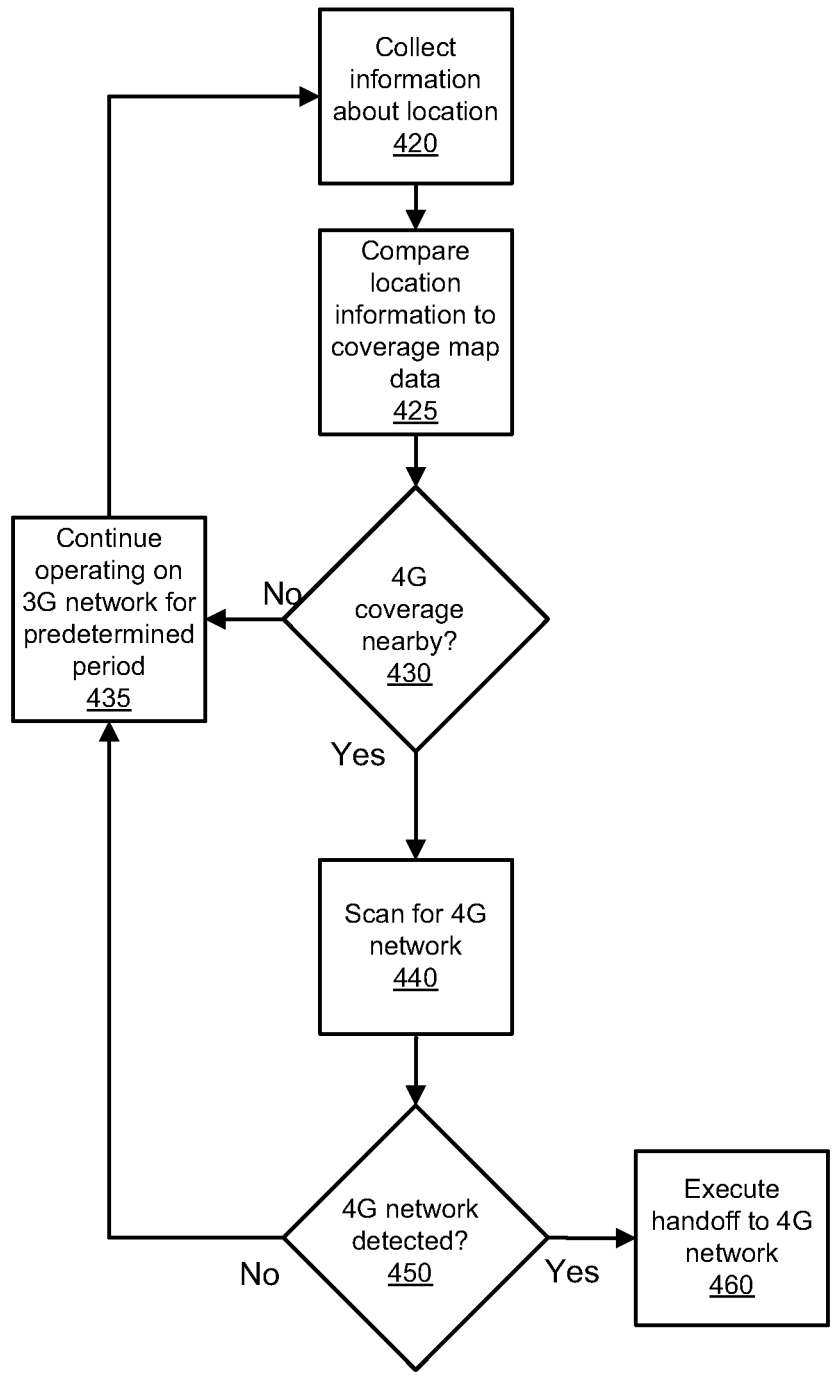
FIG. 4 is a flow diagram of a subscriber-side method for scanning for network connectivity according to an embodiment.

FIGS. 3 and 4 illustrate two methods for scanning for a 4G network that can be implemented by a user device, such as user device 110. The methods illustrated in FIGS. 3 and 4 can be executed by a dual-mode user device 110 that is currently connected to a 3G network to efficiently scan for a 4G network and execute a unilateral handoff procedure to switch from the 3G to the 4G network without requiring network involvement in the scanning process. According to an embodiment, the user device 110 can be configured to scan for the 4G network at the time that the device is powered up, and if no 4G network is found, but a 3G network is discovered by the user device 110, the user device 110 can connect to the 3G network and periodically scan for 4G network availability. According to an embodiment, the methods illustrated in FIGS. 3 and 4 can both be implemented on the user device 110 to increase the likelihood that the user device 110

FIG. 3 is a flow diagram of a method for subscriber-based vertical handoffs according to an embodiment. In an embodiment, the steps included in the method illustrated in FIG. 3 can be performed by the connection module 240 of the user device 110, unless otherwise specified.

The connection module 240 can scan for a 4G network (step 305). The connection module 240 then makes a determination whether the 4G network detected (step 310). If the 4G network was detected, the connection module can initiate a unilateral handoff between the 3G network and the 4G network (step 315).

However, if the 4G network was not detected the connection module 240 can collect information about the location of the user device 110 (step 320). In an embodiment, the connection module 240 can request the position information from the position module 265. For example, the position module 240 can use the servicing cell ID to determine an approximate location of the user device 110. In some embodiments, the cell identifier associated with other nearby base stations. According to an embodiment, position module 265 can provide GPS coordinates or estimated coordinates for the device to the collection module 240. Additional information, such as the location of the user device 110 can also be obtained from GPS unit 280.

The user device 110 can also be configured to estimate user device mobility based on the location information collected (step 325). According to an embodiment, the position module 265 can be configured to receive motion sensor data from motion sensor 280 and location information from GPS unit 280 and determine whether the user device 110 is moving and position module 265 can be configured to estimate how fast the user device 110 is moving based on the motion sensor data, GPS location information, or a combination thereof. If the user device 110 is moving, the device may be moving into an area where 4G coverage is provided. The user device 110 can be configured to increase the rate of scanning for the 4G network if the user device 110 is moving.

The connection module 240 can make determination whether user device is moving based on the estimates provided by the position module 265 (step 330). If the rate of motion of the user device 110 is high, the rate of scanning can be increased, and if the rate of motion of the user device 110 is low, the rate of scanning of the user device can be decreased.

If user device is moving, the connection module 240 can be configured to scan for 4G network at rate that is proportional to rate of motion (step 335). If the user device 110 is in motion, the user device 110 may move into a coverage area where 4G service is provided. The faster that the user device 110 is moving in an area where no 4G coverage is present, the more likely that the user device might enter into a different area where 4G coverage may be available. For example, if the user device 110 is moving in a car or other vehicle at freeway speeds, the user device 110 is likely to exit the current coverage area relatively quickly and enter into the coverage area of a different base station that provides 4G coverage. Therefore, increasing rate at which the user device 110 scans for a 4G network in proportion to the rate of speed at which the user device 110 is moving may result in the user device discovering a 4G connection, because the user device 110 is likely to enter into a different coverage area that may provide 4G coverage.

According to an embodiment, if the user device 110 is stationary or moving less than a predetermined threshold rate, the user device 110 can be configured scan for the 4G network at a reduced rate or not at all (step 340). The step relies on the assumption that if the user device 110 is not moving or is moving relatively slowly, the user device 110 is not likely to move from an area where only 3G coverage is provided to an area where 4G coverage is provided. Therefore, the connection module 240 can reduce the rate at which the user device 110 scans for 4G coverage or stop scanning for 4G coverage at all (or at least until a predetermined period of time elapses). This allows the user device 110 to conserve battery power by not scanning for 4G coverage in situations where the user device 110 is not likely to encounter 4G service.

The method can return to step 310 where the user device 110 can determine whether a 4G network is detected based on the scans performed in step 335 or 340 (step 310). If a 4G network was detected, the connection module can initiate a unilateral handoff between the 3G network and the 4G network (step 315). Otherwise, if no 4G network connection is detected, the method can return step 320 where the user device 110 can collect information about the location of the user device 110.

FIG. 4 is a flow diagram of a method for subscriber-based vertical handoffs according to an embodiment. In an embodiment, the steps included in the method illustrated in FIG. 4 can be performed by the connection module 240 of the user device 110, unless otherwise specified. In contrast with the method illustrated in FIG. 3, the method illustrate in FIG. 4 uses the coverage map information to determine whether the user device 110.

If the user device 110 did not detect a 4G network upon powering up, the connection module 240 can collect information about the location of the user device 110 (step 420). In an embodiment, the connection module 240 can request the position information from the position module 265. This step is similar to that described in step 320 of FIG. 3. For example, the position module 240 can use the servicing cell ID to determine an approximate location of the user device 110. In some embodiments, the cell identifier associated with other nearby base stations. According to an embodiment, position module 265 can provide GPS coordinates or estimated coordinates for the device to the collection module 240. Additional information, such as the location of the user device 110 can also be obtained from GPS unit 280.

The location information for the user device 110 can then be compared to coverage maps to determine whether the user device 110 is located where 4G coverage is provided (step 425). According to an embodiment, the connection module 240 can provide the location information obtained from the position module 265 to the coverage map module 255. The coverage map module 255 can then look up what type of coverage is available for the location of the user device 110 in the coverage map data 290. According to some embodiments, the coverage map module 255 can request coverage map information from the core network server 160. In some embodiments, the coverage map module 255 can store the coverage map information received from the core network server 160 in coverage map data 290.

The connection module 240 can make a determination whether there is 4G coverage available near the location of the user device 110, so that the user device 110 might be able to connect to the 4G network (step 430). If 4G network coverage is provided near the location of the user device 110, the connection module 240 can scan for a 4G network signal (step 440). The connection module can then make a determination whether a 4G network signal has been detected (step 450). If a 4G network signal is detected, the connection module 440 can execute a unilateral handoff from the 3G network to the 4G network (step 460).

If no 4G network coverage is nearby or no 4G network signal is detected when searching for a 4G network that is supposed to be nearby, the connection module 240 can continue operating on the 3G network for a predetermined time period (step 435) before returning to step 420 to continue the scanning process. According to an embodiment, the connection module 240 operates on the 3G network for a predetermined period of time before scanning for 4G coverage again to conserve battery can decrease the battery usage for the user device 110, and can also increase thermal performance, processing power, increase throughput performance, or a combination thereof, for the device.

Network Assisted Handoff

According to some embodiments, the network can assist the user device in making a determination whether to scan for 4G connectivity. Methods are described here whereby a user device 110 can scan for 4G connectivity based on instructions received from the core network server 160 and the user device 110 can perform a vertical handoff to a 4G network if a 4G network is detected.

FIG. 5 is a method that can be used track the location of a user device and instruct the user device to perform a vertical handoff from a 3G to a 4G network according to an embodiment. In an embodiment, the method illustrated in FIG. 5 can be implemented by core network server 160.

The core network server 160 can determine the location of a user device 110 (step 505). The core network server 160 can use various techniques to determine the location of the user device 110. For example, the core network server 160 can use the servicing cell ID to determine an approximate location of the user device 110. In some embodiments, the core network server 160 can send a location request message to the user device via network 140 to the base station to which the user device is connected, and the base station can send the location information request to the user device 110. The connection module 240 can be configured to request location information from position module 245 in response to the location information request. The connection module 240 can then send a location information response to the core network server 160 that includes the location of the user device 110. The location information response can include positional information as well information indicating whether the user device 110 is moving, including the direction and speed of movement in some embodiments.

The core network server 160 can then access coverage map data stored on the core network server 160 and/or on other servers operated by the mobile network provider (step 510). The core network server 160 can be configured to query a coverage map data store using location information for the user device determined by the core network server 160, obtained from the user device 110, or a combination thereof.

The core network server 160 can then determine whether 4G network coverage is available near the location of the user device 110 based on the coverage map data obtained from the coverage map data store (step 515). If the coverage map information indicates that the user device 110 is located in an area where 4G coverage is available, the core network server 160 can send a network search command to the user device 110 instructing the user device 110 to begin a search for a 4G network signal and to initiate a handoff to the 4G network if the user device 110 detects the 4G network signal (step 520). Otherwise, if the user device 110 is not located in area where 4G coverage is available, the core network server 160 can wait a predetermined period of time before checking the location of the user device again (step 525). By waiting for a period of time, before checking the location of the user device, the user device 110 may have moved sufficiently to have entered a 4G coverage area. According to some embodiments, the length of time that the core network server 160 waits before checking the location of the user device 110 can be proportional to the rate of motion of the user device 110. According to an embodiment, the core network server 160 can estimate the rate of motion of the user device 110 by comparing previously obtained location information for the user device. According to an embodiment, the information response received from the user device 110 can also include information indicating how fast the user device 110 was moving at the time the response was generated, the direction that the user device 110 was moving at the time the response was generated, or a combination thereof.

FIG. 6 is a network-assisted method for scanning for a 4G network according to an embodiment. According to an embodiment, the method illustrated in FIG. 6 can be implemented by the user device 110. For example, in an embodiment, the connection module 240 can implement the steps illustrated in the method of FIG. 6. According to an embodiment, the network-assisted method illustrated in FIG. 6 can be used in conjunction with one or both of the methods illustrated in FIGS. 3 and 4 described above.

The user device 110 can receive an instruction to begin scanning for a signal of a 4G network (step 605). According to an embodiment, if the core network server 160 determines that the user device 110 is located in an area where 4G coverage is available, the core network server 160 can send a network search command to the user device 110 instructing the user device 110 to begin a search for a 4G network signal and to initiate a handoff to the 4G network if the user device 110 detects the 4G network signal.

In response to the network search command, the user device 110 can scan for a signal of a 4G network (step 610). According to an embodiment, the connection module 240 can scan for a 4G network signal. The connection module can then make a determination whether a 4G network signal has been detected (step 615). If a 4G network signal is detected, the connection module 440 can execute a unilateral handoff from the 3G network to the 4G network (step 620). If no 4G network signal is detected, the connection module 240 can continue operating the user device 110 using a 3G connection. Optionally, the connection module 240 can send a message to the core network server 160 indicating whether the connection module 240 was able to detect the 4G network and perform a handoff.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

What is claimed is:

1. A method for managing network connectivity of a wireless device, the method comprising:
    scanning for a signal of a first wireless network while the wireless device is connected to a second wireless network, the first wireless network and the second wireless network being configured to operate using different wireless communication protocols;
    executing a vertical handoff from the second wireless network to the first wireless network if the signal of the first wireless network is detected;
    operating the wireless device in a scanning mode if the signal of the first wireless network is not detected, wherein operating the wireless device in the scanning mode further comprises
        collecting information about the location of the wireless device,
        estimating mobility of the wireless device based on the location information,
        determining whether the wireless device is mobile,
        scanning for the signal of the first wireless network at a rate proportional to a rate of mobility associated with the wireless device if the wireless device is mobile, and
        scanning for the signal of the first wireless network at a reduced rate if the wireless device is not mobile.

2. The method of claim 1 wherein collecting information about the location of the wireless device includes receiving data from a motion sensor associated with the wireless device.

3. The method of claim 2 wherein collecting information about the location of the wireless device includes receiving location information from a GPS unit associated with the wireless device.

4. The method of claim 2 wherein collecting information about the location of the wireless device includes determining a serving cell identifier associated with a base station providing wireless service to the wireless device.

5. The method of claim 4 wherein estimating mobility of the wireless device based on the location information further comprises comparing a previous serving cell identifier to a current serving cell identifier to determine whether the wireless device is moving.

* * * * *